(12) United States Patent
Figgins

(10) Patent No.: US 7,930,871 B1
(45) Date of Patent: Apr. 26, 2011

(54) CUTTERBAR SUPPORT FOR A CROP HARVESTING HEADER

(75) Inventor: Ryan M. Figgins, New Holland, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/748,550

(22) Filed: Mar. 29, 2010

(51) Int. Cl.
*A01D 67/00* (2006.01)
(52) U.S. Cl. .................................................. 56/208
(58) Field of Classification Search ............ 56/181, 56/208, 212–217, 10.4, 15.8, 15.9, 17.2; 267/278, 277, 273; 280/124.137, 124.102, 280/124.167, 124.101
See application file for complete search history.

(56) References Cited

U.S. PATENT DOCUMENTS

| | | | |
|---|---|---|---|
| 3,243,199 A | 3/1966 | Birney et al. | |
| 3,432,158 A | 3/1969 | Goodwin | |
| 4,635,958 A | 1/1987 | Yonemoto | |
| 4,669,256 A | 6/1987 | Ermacora et al. | |
| 4,724,661 A * | 2/1988 | Blakeslee et al. ............... | 56/208 |
| 5,157,905 A * | 10/1992 | Talbot et al. .................... | 56/15.9 |
| 5,186,216 A | 2/1993 | Bollier | |
| 5,464,371 A * | 11/1995 | Honey ............................ | 460/20 |
| RE35,543 E * | 7/1997 | Patterson ........................ | 56/14.4 |
| 5,685,527 A | 11/1997 | Harbali et al. | |
| 5,921,569 A | 7/1999 | Noutomi et al. | |
| 6,269,619 B1 | 8/2001 | Walch et al. | |
| 6,675,568 B2 * | 1/2004 | Patterson et al. ................ | 56/208 |
| 7,207,164 B2 * | 4/2007 | Bomleny ................... | 56/10.2 E |
| 7,222,475 B2 * | 5/2007 | Bomleny et al. ........... | 56/10.2 E |
| 7,430,846 B2 * | 10/2008 | Bomleny et al. ........... | 56/10.2 E |
| 2004/0065069 A1 * | 4/2004 | Dunn et al. ..................... | 56/10.4 |
| 2008/0072560 A1 * | 3/2008 | Talbot ............................. | 56/208 |
| 2008/0078155 A1 * | 4/2008 | Coers et al. .................... | 56/15.8 |
| 2009/0277144 A1 * | 11/2009 | Honas et al. .................... | 56/153 |
| 2010/0043372 A1 * | 2/2010 | Honas et al. .................... | 56/181 |

* cited by examiner

*Primary Examiner* — Árpád Fábián-Kovács
(74) *Attorney, Agent, or Firm* — Michael G. Harms; Patrick M. Sheldrake

(57) ABSTRACT

A system for supporting a cutterbar of a crop harvesting header includes a first arm pivotably secured to the header and including a first portion configured to support the cutterbar, and a second portion including a torsion device connected to an adjustment assembly, the second portion configured to be pivotably rotatable about an axis by the adjustment assembly to selectably increase or decrease a force appliable to the first portion in order to raise or lower the first portion with respect to the header. The adjustment assembly includes a second arm interconnecting the torsion device and a first adjustment device having a first segment, the first adjustment device configured to movably receive a second adjustment device. The first segment follows a predetermined path in a first or second direction with respect to the axis in response to movement of the second adjustment device with respect to the first adjustment device.

20 Claims, 9 Drawing Sheets

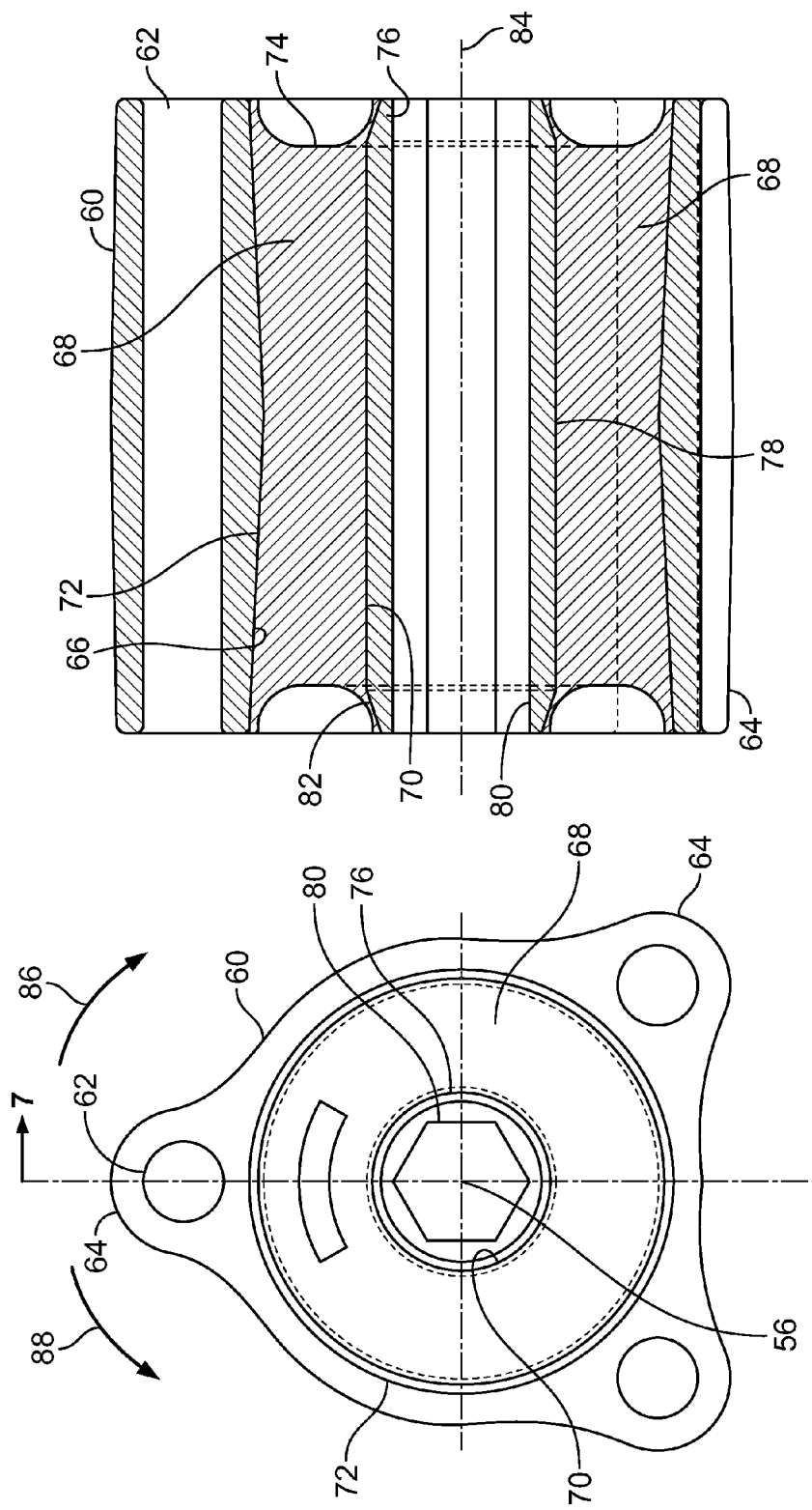

CUTTERBAR SUPPORT FOR A CROP HARVESTING HEADER

FIELD OF THE INVENTION

The present invention relates generally to crop harvesting headers for use with crop harvesting devices. It relates more particularly to a system for supporting a cutterbar of a crop harvesting header.

BACKGROUND OF THE INVENTION

The cutting assemblies of the known large headers of plant-cutting machines (e.g., combine, windrower) are typically driven by an oscillating drive, which can include, but is not limited to, an eccentric shaft on a rotating hub, a wobble drive, or a similar well-known commercially-available device. A cutting assembly is typically supported by a flexible cutterbar that spans the width of the opening of the crop harvesting header. The cutterbar is typically supported by arms that extend transverse to the cutterbar. Unfortunately, the weight of cutting assembly is not uniformly distributed across the cutting width of the harvesting header, possibly causing bowing of the cutter bar, and the cutting assembly, resulting in uneven cutting height of the plant, as well as other undesirable results.

What is needed is a system that provides substantially uniform support along the length of the cutting assembly by permitting selective adjustment of the forces the arms provide to the cutter bar.

SUMMARY OF THE INVENTION

The present invention relates to a system for supporting a cutterbar of a crop harvesting header including a first arm pivotably secured to the header. The first arm includes a first portion configured to support the cutterbar, the first arm including a second portion including a torsion device connected to an adjustment assembly. The second portion is configured to be pivotably rotatable about an axis by the adjustment assembly to selectably increase or decrease a force appliable to the first portion in order to raise or lower the first portion with respect to the header. The adjustment assembly includes a second arm interconnecting the torsion device and a first adjustment device having a first segment, the first adjustment device is configured to movably receive a second adjustment device. The first segment of the first adjustment device is configured to follow a predetermined path in a first direction with respect to the axis in response to movement of the second adjustment device in a first tendency with respect to the first adjustment device. The first segment of the first adjustment device is configured to follow a predetermined path in a second direction with respect to the axis in response to movement of the second adjustment device in a second tendency opposite the first tendency with respect to the first adjustment device.

The present invention further relates to a system for supporting a cutterbar of a crop harvesting header including a first arm pivotably secured to the header. The first arm includes a first portion configured to support the cutterbar, and the first arm includes a second portion having a torsion device connected to an adjustment assembly and configured to be pivotably rotatable about an axis substantially parallel to the cutterbar to selectably increase or decrease a force appliable to the first portion in order to raise or lower the first portion with respect to the header. The adjustment assembly includes a second arm interconnecting the torsion device and a first adjustment device having a first segment, the first adjustment device configured to movably receive a second adjustment device. The first segment of the first adjustment device is configured to follow a predetermined path in a first direction with respect to the axis in response to movement of the second adjustment device in a first tendency with respect to the first adjustment device. Further movement of the second adjustment device in the first tendency with respect to the first adjustment device increases an amount of torsional force applied to raise the first portion of the first arm with respect to the header. The first segment of the first adjustment device is configured to follow a predetermined path in a second direction with respect to the axis in response to movement of the second adjustment device in a second tendency opposite the first tendency with respect to the first adjustment device. Further movement of the second adjustment device in the second tendency with respect to the first adjustment device increases an amount of torsional force applied to lower the first portion of the first arm with respect to the header.

An advantage of the present invention is the application of a substantially uniform support force for the cutterbar, resulting in improved crop harvesting.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 6 is an enlarged end view of a torsion device of the present invention.

FIG. 7 is a cross section taken along line 7-7 from FIG. 6 of the present invention.

Wherever possible, the same reference numbers will be used throughout the drawings to refer to the same or like parts.

DETAILED DESCRIPTION OF THE INVENTION

Figure 1:
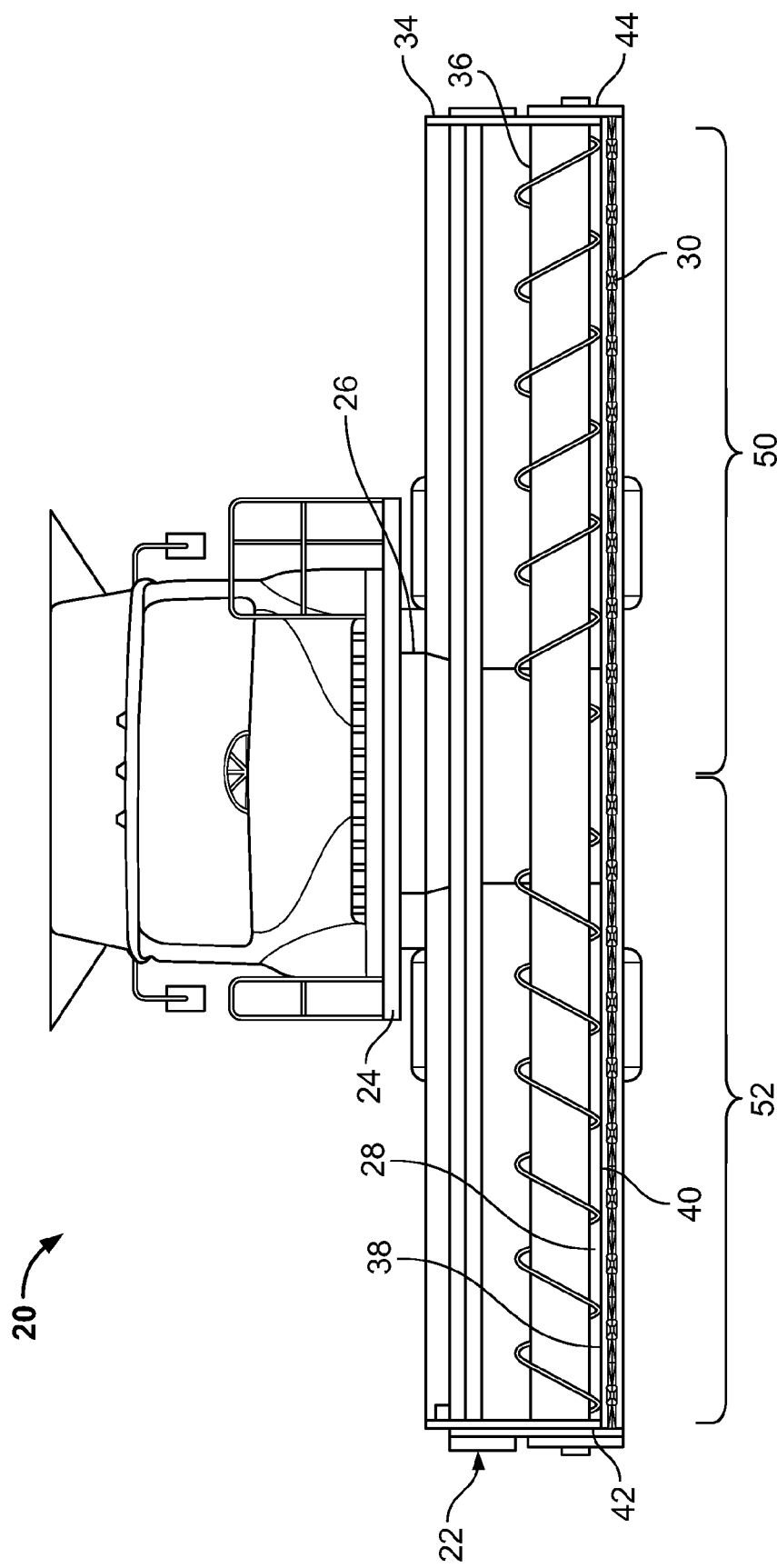
FIG. 1 is a front view of an embodiment of a crop harvesting device and harvesting header of the present invention.

A combine 20, which is a well-known agricultural cutting and harvesting machine, is shown in FIG. 1. Combine 20 includes a header 22, which is configured to cut or sever crops, including (without limitation) small grains (e.g., wheat, soybeans), and to induct the cut or severed crops into a feeder 26. Both functions can be performed as combine 20 moves forward over a crop field.

Figure 2:
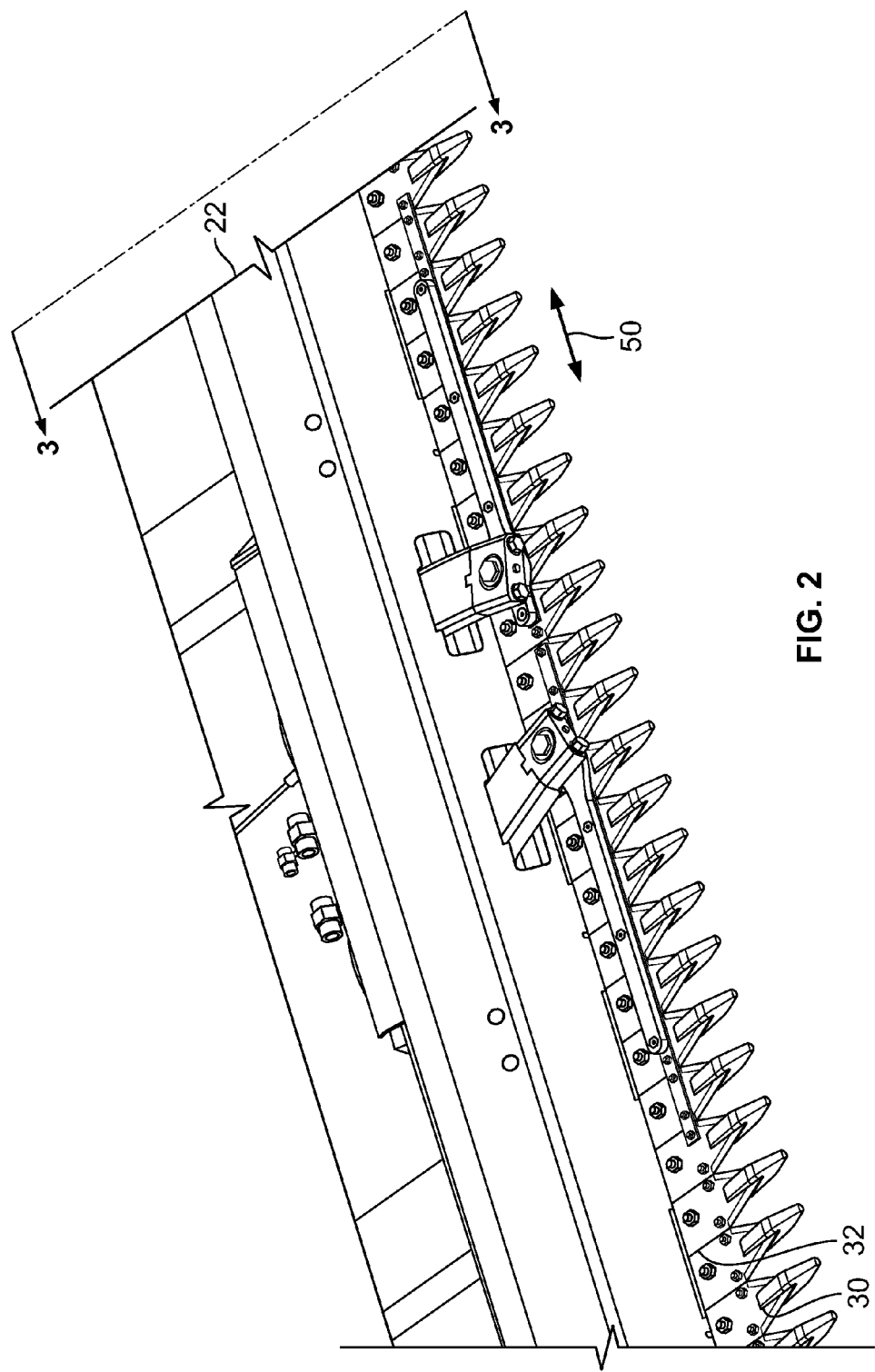
FIG. 2 is a top perspective view of the crop harvesting device of FIG. 1 of the present invention.

Header 22 is attached to a forward end 24 of combine 20 and includes a pan or floor 28 that is supported in desired proximity to the surface of a crop field. Header 22 includes an elongated sidewardly extending sickle 30 along a forward edge portion 32 (see FIG. 2) of floor 28. A cutter or sickle 30 is configured to cut or sever crops, in preparation for induction into a feeder 26. Additionally, header 22 may include an elongate, sidewardly extending reel 34 disposed above sickle 30. Reel 34 is rotatable in a direction suitable for facilitating the induction of cut or severed crops into feeder 26. Header 22 further includes an elongate, rotatable auger 36, which extends in close proximity to a top surface 38 of floor 28 and has helical flights therearound. Auger 36 is configured to cooperate with reel 34 in conveying cut or severed crops to feeder 26, which is configured to convey the cut or severed crops into combine 20 for threshing and cleaning. Alternatively, instead of rotatable auger 36, header 22 may include a draper header or other crop harvesting/gathering header.

Sickle 30 extends along a forward edge 40 of floor 28, and generally is bounded by a first side edge 42 and an opposing second side edge 44, both of floor 28. Sickle 30 is supported by a cutterbar 45 (see FIG. 3) which is likewise supported by a first portion 46 of an elongated member or first arm 48 that will be discussed in further detail below. During operation, sickle 30 reciprocates rapidly to effect a cutting or severing action that cuts or severs plant stems, stalks or other material present between the blades of the sickle. As denoted by arrow 50, the sickle blades can reciprocate sideways.

Figure 3:
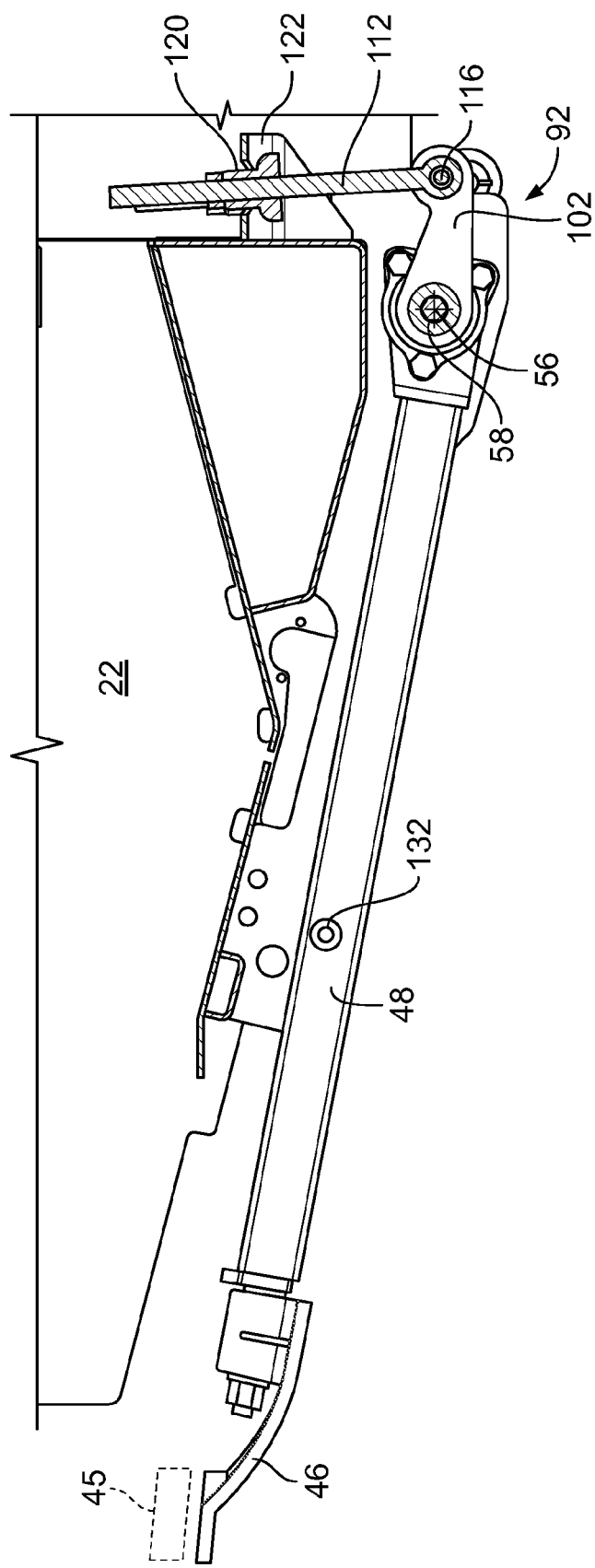
FIG. 3 is a cross section taken along line 3-3 of the present invention.
Figure 4:
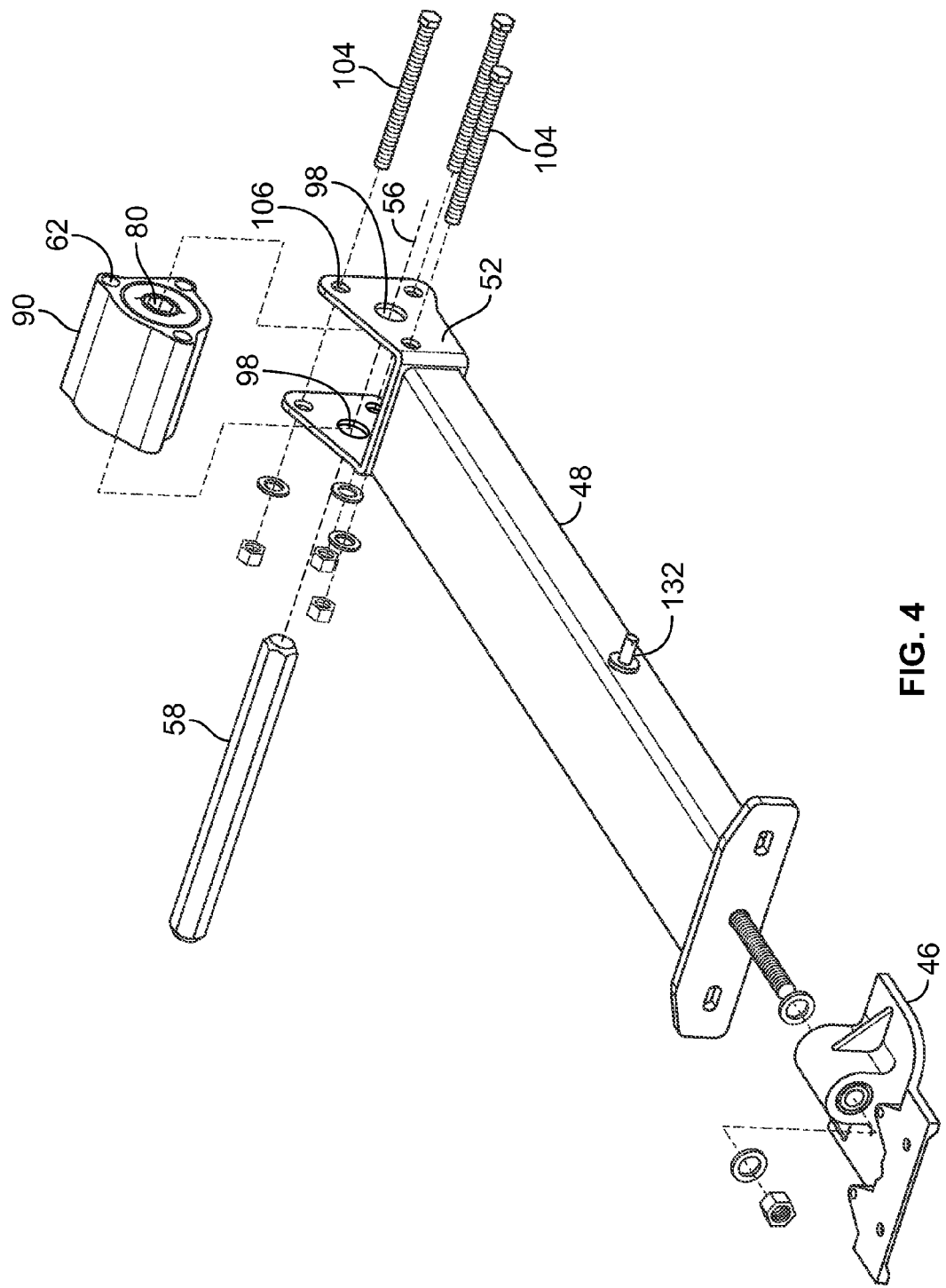
FIG. 4 is an exploded view of a cutterbar support arm of the present invention.
Figure 5:
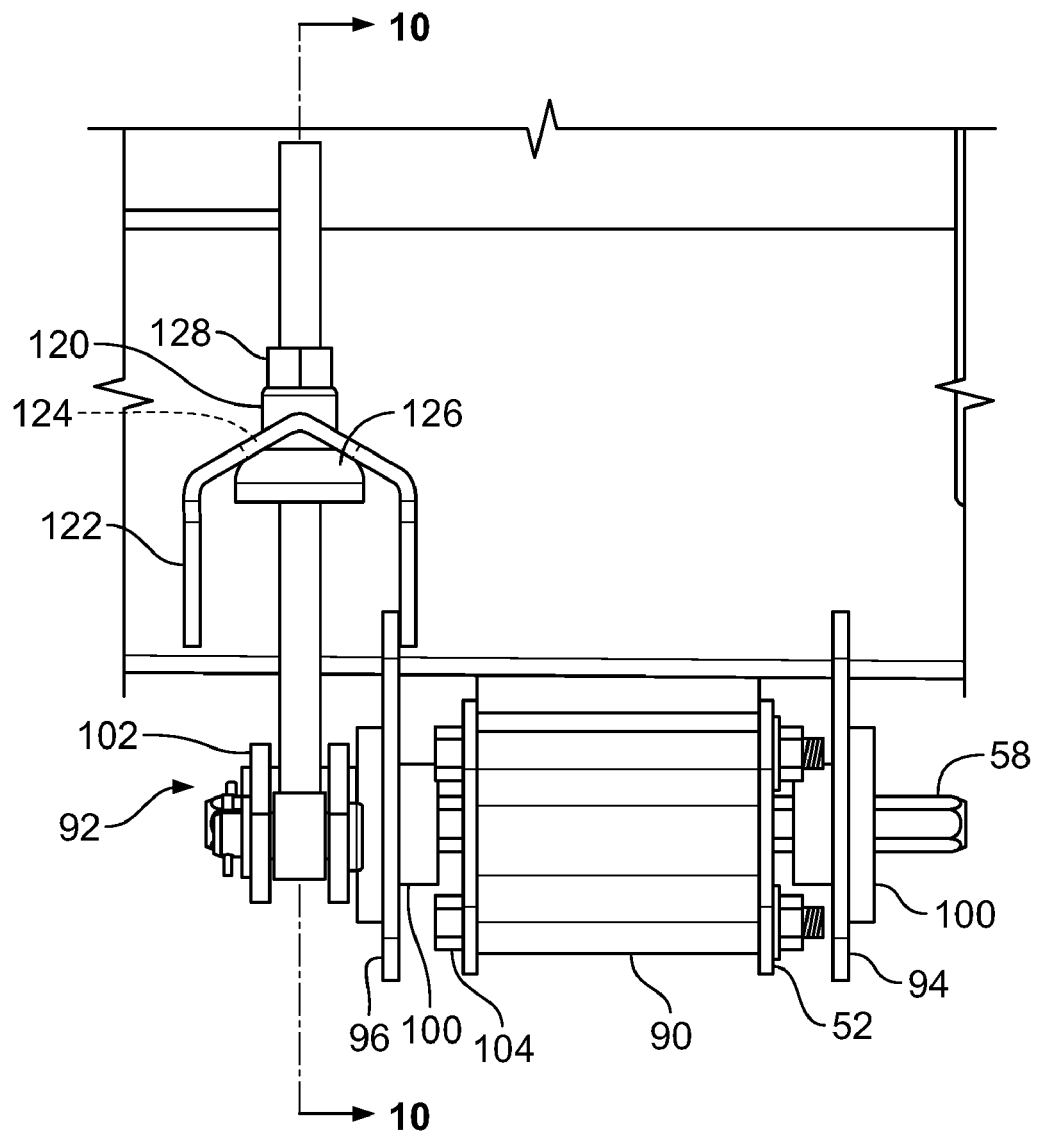
FIG. 5 is a forward-looking end view of an adjustment device of the present invention.
Figure 8:
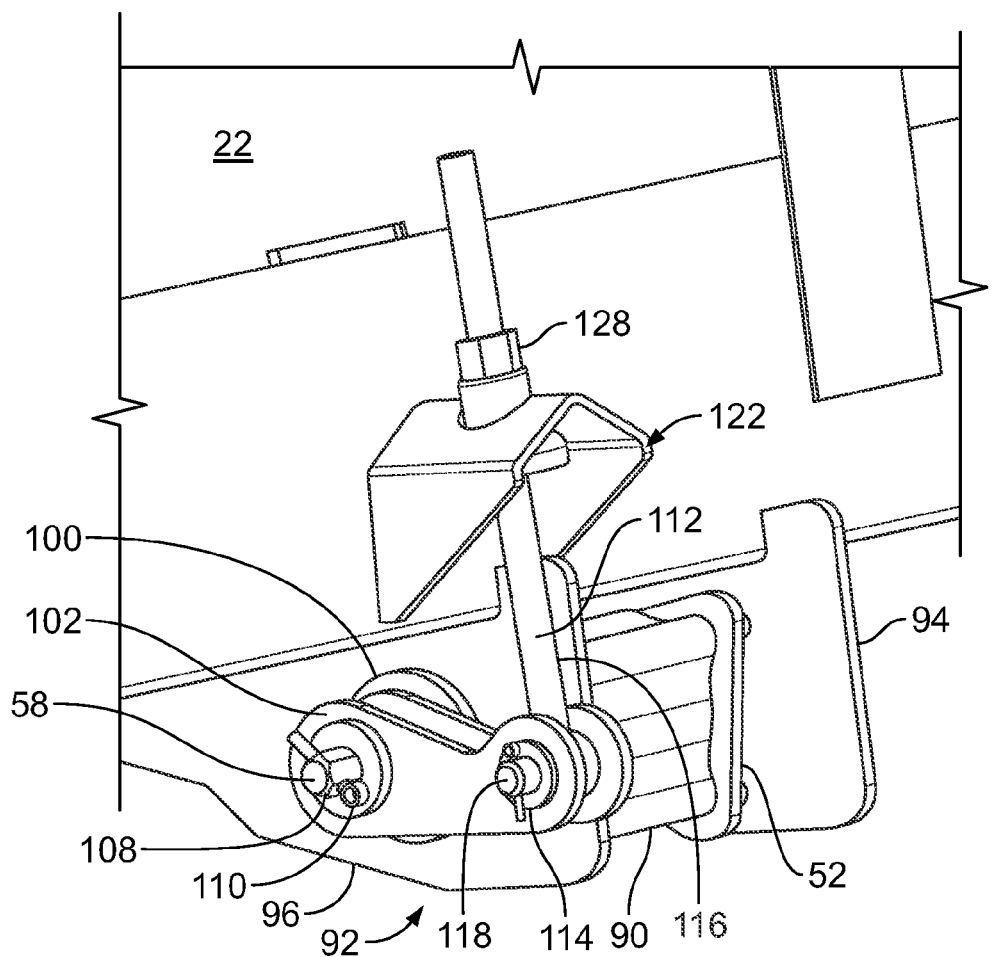
FIGS. 8-9 are enlarged top perspective views of the adjustment device of FIG. 5 shown in different rotational positions of the present invention.
Figure 9:
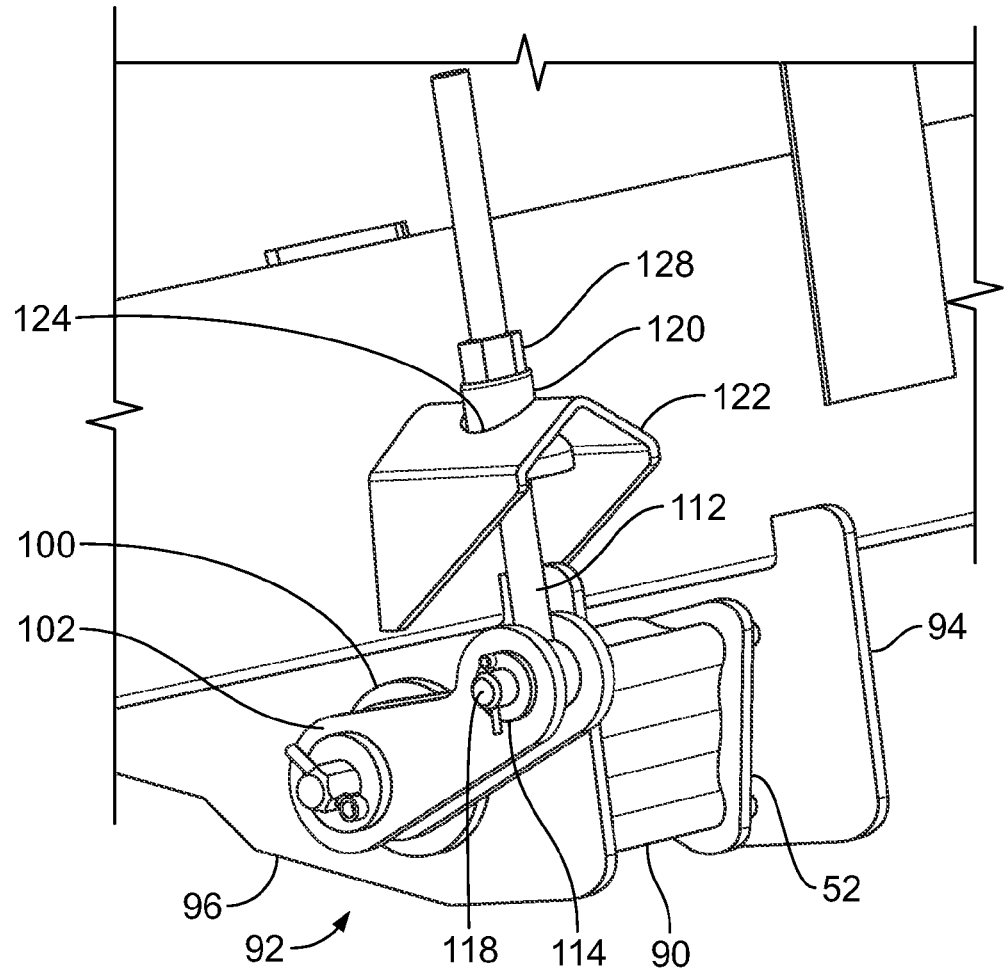

As shown in FIGS. 3-5, a C-bracket or second portion 52 of member or first arm 48 is pivotably secured to header 22 about an axis 56 by a rod 58 having a non-circular periphery, such as a hexagonal periphery. Rod 58 further extends through openings formed in plates 94, 96 that are secured to header 22 and laterally surround second portion 52. In other words, rod 58 extends through each of plates 94, 96, apertures 98 formed in second portion 52 and torsion device 90. That is, fasteners 104 are first inserted through respective aligned openings 106 in second portion 52 and apertures formed in torsion device 90 to secure the torsion device to the second portion (assembling the exploded view of FIG. 4). Once the torsion device 90 is assembled to the second portion 52, aperture 98 of second portion 52 is positioned between and aligned with openings (not shown) formed in plates 94, 96 and their respective bushings 100, rod 58 may then be inserted through plates 94, 96, bushings 100, second portion 52 and torsion device 90 (see FIG. 5). After insertion of rod 58, the outer periphery of rod 58 and an inside surface 80 (see FIG. 4) of torsion device 90 are placed in a non-rotating relationship, i.e., they become mated surfaces. Finally, opening 108 (see FIG. 8) of second arm 102 is aligned and slid over rod 58, with opening 108 and rod 58 defining mating surfaces and fastener 110 installed in rod 58 to secure rod 58 in its installed position. Although second arm 102 forms part of adjustment assembly 92, adjustment assembly 92 will be discussed in further detail below. At this point, in response to first arm 48 being urged into rotational movement about axis 56, by virtue of the mating surfaces between rod 58 and inside surface 80 of torsion device 90 and between opening 108 of second arm 102 and rod 58, rod 58 and second arm 102 would each be urged into rotation about axis 56.

FIGS. 6-7 show a side view and a cross section, respectively, of torsion device 90. Torsion device 90 includes a housing 60 includes a plurality of lobes 64 having corresponding apertures 62 formed in the lobes, permitting the housing to be secured to other structure, such as plate 94, 96 (FIG. 5) by mechanical fasteners 104 extending through the other structure and apertures 62. Housing 60 includes an inside surface 66 that may include a tapered surface, such as shown in FIG. 7. A member 68, which includes an inside surface 70 and an outside surface 72, is composed of a resilient material and is inserted inside of housing 60. In one embodiment, member 68 is composed of a non-metal, such as a rubber material. Inside surface 66 of housing 60 is configured to receive outside surface 72 of member 68 and define a substantially non-rotational contact therebetween. Stated another way, subsequent to insertion of member 68 inside of housing 60, in response to a rotational movement 86 applied in a clockwise direction about axis 56 to housing 60 and an opposed rotational movement 88 applied in a counter clockwise direction about axis 56 to member 68, inside surface 66 and outside surface 72 should not rotatably move with respect to each other. Such non-rotational contact may be established by application of adhesives, interference-fit (due to the periphery of inside surface 66 being larger than the periphery of outside surface 72), mating surface features, such as splines, or the like.

As further shown in FIGS. 6-7, inside surface 70 of member 68 is configured to receive a sleeve 76 having an outside surface 78 and inside surface 80. Housing 60 and sleeve 76 are composed of substantially rigid materials, such as metals. When member 68 and sleeve 76 are assembled together, inside surface 70 of the member and outside surface 78 of the sleeve define a substantially non-rotational contact therebetween, as discussed above. Inside surface 80 of sleeve 76 defines a geometric shape that is configured to receive an object, such as a shaft, in a substantially non-rotational contact. As shown in FIG. 6, inside surface 80 defines a hexagonal profile, although other profiles may be used. In a further embodiment, sleeve 76 may not be used, if inside surface 70 of member 68 defines a hexagonal profile, for example.

As shown in FIG. 7, member 68 includes recessed ends 74. In one embodiment, recessed ends 74 may be created during the normal cooling process of member 68, which may be composed of rubber or another suitable resilient material. That is, member 68 may be heated to a liquid state and then installed while in the liquid state, such as by pouring or injection molding, into housing 60 between inside surface 70 and outside surface 72. During cooling, member 68 bonds to each of inside surface 70 and outside surface 72. In an alternate embodiment, member 68 may be press-fit between inside surface 70 and outside surface 72. In yet another embodiment, member 68 may be secured between inside surface 70 and outside surface 72 by use of an adhesive.

In summary, by virtue of the collective substantially non-rotational contacts established between corresponding surfaces of housing 60, member 68, sleeve 76 and a shaft received by the sleeve, in response to a rotational movement 86 about axis 56 applied by a shaft 58, and a counter rotational movement 88 about axis 56 applied to oppose the rotational movement applied by the shaft, the member is subjected to a torsional force, which is the basis for the equalizing torsional force provided by the support system.

It is to be understood that irrespective the utilization or inclusion of a sleeve as part of the stabilization system of the present invention, resilient member 68 is considered to have been placed in a substantially non-rotational contact with the inside surface of the member with that of the object being inserted inside the sleeve. For example, the sleeve could be associated with either the frame of the header or the frame of the crop harvesting device, depending upon the application and or installation of the stabilization system.

Referring to FIGS. 3, 5, and 8-10, adjustment assembly 92 is now discussed. Adjustment assembly 92 includes second arm 102 having an aperture 114 located distantly from opening 108 that is pivotably connected, such as by fastener 118 to a first segment 116 of a first adjustment device 112. In one embodiment, first segment 116 includes an eyelet (see FIG. 3) formed in first adjustment device 112, with the first adjustment device being a threaded rod. First adjustment device 112 is movably connected with a second adjustment device 120. In one embodiment, the second adjustment device is a threaded nut configured to mate with the first adjustment device. After assembly, second adjustment device 120 is placed in abutting contact with the portion of header 22. In one embodiment, the portion of header 22 is a bracket 122, in which the abutting contact occurs between a portion of the exterior surface of second adjustment device 120 and at least a portion of a surface of an aperture 124. In one embodiment, at least a portion of second adjustment device 120 includes a tapered surface 126. In one embodiment, tapered surface 126 is curved. Tapered surface 126 is configured to increase the amount of surface area of the abutting contact between the surface of aperture 124 of bracket 122, thereby reducing the amount of resistance required to move second adjustment device 120 with respect to bracket 122. In a further embodiment, the abutting contact surfaces between tapered surface 126 and aperture 124 define conformal surfaces. That is, the abutting contact surfaces substantially conform with each other to maximize the amount of shared surface area to reduce the amount of resistance between the contact surfaces in response to a given force directed perpendicular to the contact surfaces. To urge rotational movement of second adjustment device 120 with respect to bracket 122, a region 128 is provided to receive a tool, such as a wrench, or in another embodiment, the region defines an opening to receive a lever arm.

By virtue of adjustment assembly 92, such as shown in the FIG. 3, first portion 46 of first arm 48 can be selectively raised or lowered. In other words, in response to a rotational movement in a first rotational direction or a first tendency of second adjustment device 120, second adjustment device 120 is placed in abutting contact with bracket 122 such that the length of first adjustment device 112 between bracket 122 and eyelet 116 is increased, urging second arm 102 to rotate about axis 56. When sufficient rotation of second arm 102 has occurred, and has applied a sufficient torsional force to torsion device 90, first portion 46 of first arm 48 is raised with respect to header 22 subject to the header encountering a stop 132 extending from the first arm. Stop 132 may also be employed to limit the lowest position of first portion 46 with respect to header 22. Conversely, in response to a rotational movement in a second rotational direction or a second tendency of second adjustment device 120, second adjustment device 120 is placed in abutting contact with bracket 122 such that the length of first adjustment device 112 between bracket 122 and eyelet 116 is decreased, urging second arm 102 to rotate about axis 56. When sufficient rotation of second arm 102 has occurred, and has applied a sufficient torsional force to torsion device 90, first portion 46 of first arm 48 is lowered with respect to header 22. Depending upon the application, multiple first arms 48 may be used to provide support for the cutter bar.

It is also to be understood that while adjustment assembly 92 may be used to selectively raise or lower first portion 46 of first arm 48, the same techniques and interaction between components previously discussed may also be used to selectively increase or decrease a force that may be applied to first portion 46 of first arm 48 in order to raise or lower first portion with respect to header 22. That is, for example, stop 132 extending from first arm 46 may be in abutting contact (not shown) with header 22 such that first arm 46 cannot be further lowered with respect to header 22. For purposes of discussion only, and not intending to be limiting, a force of X pounds may be required to raise first portion 46 with respect to header 22. By moving second adjustment device 120 in a first tendency, without raising/lowering first portion 46 with respect to header 22, a force of Y pounds (Y<X) may then be required to raise first portion 46 with respect to header 22. Conversely, by moving second adjustment device 120 in a second tendency, instead of a first tendency, also without raising/lowering first portion 46 with respect to header 22, a force of Z pounds (Z>X) may then be required to raise first portion 46 with respect to header 22. In other words, for purposes of comparison only, X, Y and Z correspond to magnitudes of forces each being applied in the same direction with respect to the header in order to raise or lower the header. In one embodiment, the magnitude of force required to raise or lower the first portion of each first arm would be the same.

Figure 10:
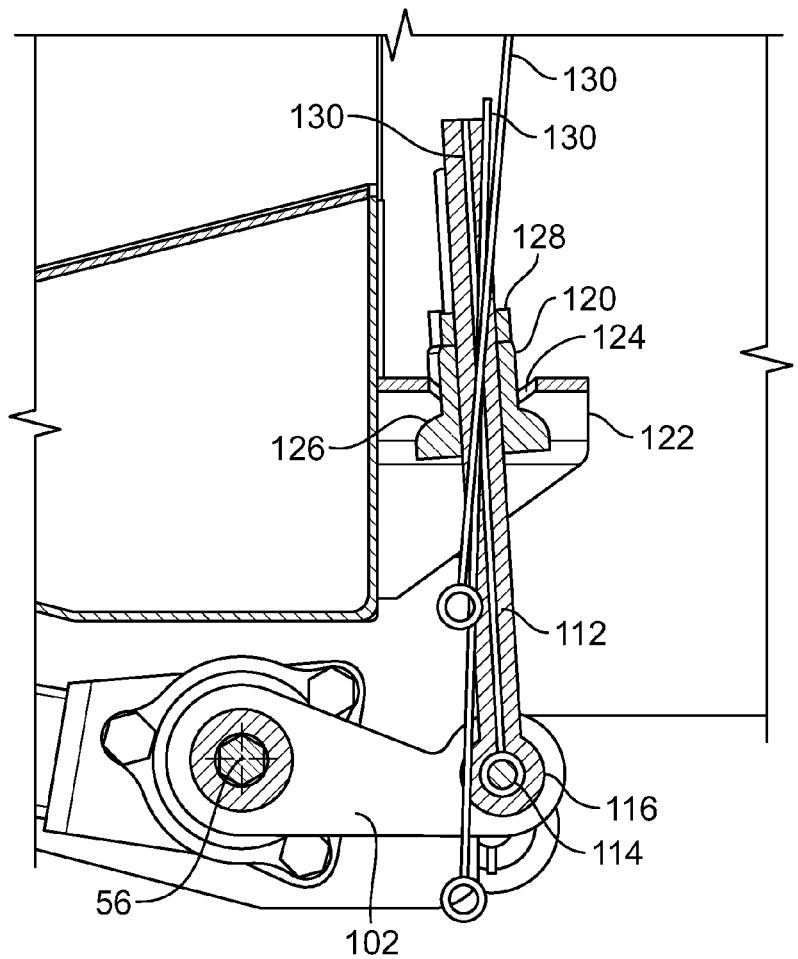
FIG. 10 a cross section taken along line 10-10 of the adjustment device of FIG. 5 of the present invention.

By virtue of the arrangement of adjustment assembly 92, due to first adjustment device 112 being located between second arm 102 and second adjustment device 120, during operation of the adjustment assembly, first segment or eyelet 116 of first adjustment device 112 is configured to follow a predetermined path with respect to axis 56. In the exemplary embodiment as shown in FIG. 10, a predetermined path of first segment or eyelet 116 corresponds to the radius defined by axis 56 and aperture 114 of second arm 102. As a result of this arrangement, over the operating range of adjustment assembly 92, bending forces that could otherwise be applied to first adjustment device and cause damage to the first adjustment device are virtually eliminated. That is, by virtue of the movable abutting contact between tapered surface 126 and the surface of aperture 124 of bracket 122 over the operating range of angular movement of second arm 102 about axis 56, including different positions as shown in respective FIGS. 8 and 9 and as shown in FIG. 10 by a centerline representation 130 of first adjustment device 112, first adjustment device 112 can pivot with virtually no lateral forces associated with the abutting contact.

Figure 11:
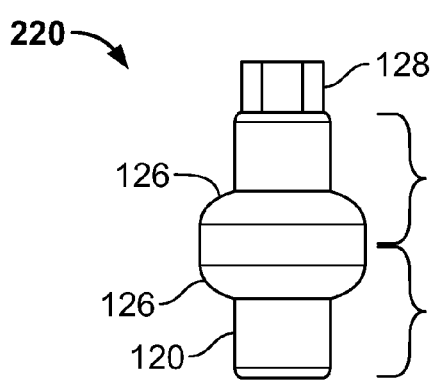
FIGS. 11-12 are embodiments of a second adjustment device of the present invention.
Figure 12:
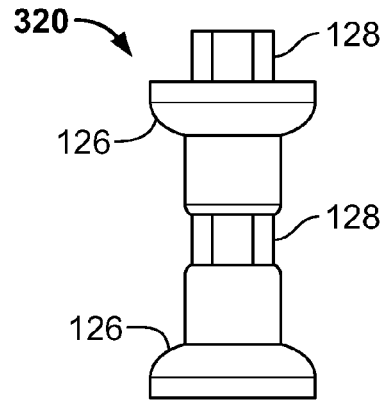

Referring to FIGS. 11 and 12, alternative embodiments of second adjustment device 220, 320 are shown, in which opposed tapered surfaces are combined into a single component. For second adjustment device 220, the larger ends of the tapered surfaces face each other, which would normally require removal of the second adjustment device from the mating first adjustment device if the rotational direction or tendency were to be reverse. For second adjustment device 320, the smaller ends of the tapered surfaces face each other, which should not require removal of the second adjustment device from the mating first adjustment device if the rotational direction or tendency were to be reversed. However, the aperture 124 of bracket 122 would need to be "opened up" to form a slot in order to receive second adjustment bracket 320. Adjustment regions 128 configured to receive tools could be located as shown or in other locations.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for supporting a cutterbar of a crop harvesting header comprising:
   a first arm pivotably secured to the header, the first arm including a first portion configured to support the cutterbar, the first arm including a second portion including a torsion device connected to an adjustment assembly, the second portion configured to be pivotably rotatable about an axis by the adjustment assembly to selectably increase or decrease a force appliable to the first portion in order to raise or lower the first portion with respect to the header;

the adjustment assembly including a second arm interconnecting the torsion device and a first adjustment device having a first segment, the first adjustment device configured to movably receive a second adjustment device;

wherein the first segment of the first adjustment device is configured to follow a predetermined path in a first direction with respect to the axis in response to movement of the second adjustment device in a first rotational direction with respect to the first adjustment device; and wherein the first segment of the first adjustment device is configured to follow a predetermined path in a second direction with respect to the axis in response to movement of the second adjustment device in a second rotational direction opposite the first rotational direction with respect to the first adjustment device.

2. The system of claim 1, wherein the axis is substantially parallel to the cutterbar.

3. The system of claim 1, wherein further movement of the second adjustment device in the first rotational direction with respect to the first adjustment device increases an amount of torsional force applied to the first portion of the first arm with respect to the header, resulting in a decrease of the force appliable to the first portion in order to raise the first portion with respect to the header.

4. The system of claim 1, wherein further movement of the second adjustment device in the second rotational direction with respect to the first adjustment device decreases an amount of torsional force applied to the first portion of the first arm with respect to the header, resulting in an increase of the force appliable to the first portion in order to raise the first portion with respect to the header.

5. The system of claim 1, wherein the second adjustment device includes a tapered surface in abutting contact with a portion of the header.

6. The system of claim 5, wherein the portion of the header is a bracket having a surface for receiving the tapered surface of the second adjustment device.

7. The system of claim 6, wherein the bracket surface is defined by an aperture.

8. The system of claim 5, wherein the tapered surface is curved.

9. The system of claim 6, wherein the respective abutting surfaces between the bracket and the second adjustment device define conformal surfaces.

10. The system of claim 1, wherein the first adjustment device is a threaded rod with an opening positioned adjacent the first segment.

11. The system of claim 1, wherein the second adjustment device threadedly engages the first adjustment device.

12. The system of claim 1, wherein the torsion device includes a member having an inside surface connectable in substantially non-rotational contact to a first structure of one of the first arm or the header, and an outside surface connectable in substantially non-rotational contact to a second structure of the other of the first arm or the header; and wherein in response to rotational movement of the first structure in substantially non-rotational contact with the inside surface, there being rotational movement of the first structure with respect to the second structure in substantially non-rotational contact with the outside surface, the member provides a torsional force between respective first and second positions of the first arm with respect to the header.

13. The system of claim 12, wherein the member comprises a contiguous mass of resilient material.

14. The system of claim 13, wherein the resilient material is a non-metal.

15. The system of claim 14, wherein the non-metal is a rubber material.

16. The system of claim 5, wherein the second adjustment device includes a region configured to receive a tool for urging the second adjustment device into movement with respect to first adjustment device.

17. The system of claim 16, wherein the second adjustment device includes opposed tapered surfaces, each tapered surface configured to form an abutting contact with a portion of the header.

18. The system of claim 17, wherein the second adjustment device may be moved in either of the first rotational direction or the second rotational direction without removing the second adjustment device from the first adjustment device.

19. A system for supporting a cutterbar of a crop harvesting header comprising:

a first arm pivotably secured to the header, the first arm including a first portion configured to support the cutterbar, the first arm including a second portion including a torsion device connected to an adjustment assembly and configured to be pivotably rotatable about an axis substantially parallel to the cutterbar to selectably increase or decrease a force appliable to the first portion in order to raise or lower the first portion with respect to the header;

the adjustment assembly including a second arm interconnecting the torsion device and a first adjustment device having a first segment, the first adjustment device configured to movably receive a second adjustment device;

wherein the first segment of the first adjustment device is configured to follow a predetermined path in a first direction with respect to the axis in response to movement of the second adjustment device in a first rotational direction with respect to the first adjustment device;

wherein further movement of the second adjustment device in the first rotational direction with respect to the first adjustment device increases an amount of torsional force applied to the first portion of the first arm with respect to the header, resulting in a decrease of the force applied to the first portion in order to raise the first portion with respect to the header;

wherein the first segment of the first adjustment device is configured to follow a predetermined path in a second direction with respect to the axis in response to movement of the second adjustment device in a second rotational direction opposite the first rotational direction with respect to the first adjustment device; and wherein further movement of the second adjustment device in the second rotational direction with respect to the first adjustment device decreases an amount of torsional force applied to the first portion of the first arm with respect to the header, resulting in an increase of the force appliable to the first portion and order to raise the first portion with respect to the header.

20. The system of claim 19, wherein the second adjustment device includes a tapered surface in abutting contact with a portion of the header.

* * * * *